US009268152B2

(12) United States Patent
Provensen (10) Patent No.: US 9,268,152 B2
(45) Date of Patent: Feb. 23, 2016

(54) STRAP ASSEMBLY ADAPTED FOR USE TO SECURE EYEWEAR TO WEARER

(71) Applicant: Jina T. Provensen, Huntington Beach, CA (US)

(72) Inventor: Jina T. Provensen, Huntington Beach, CA (US)

( * ) Notice: Subject to any disclaimer, the term of this patent is extended or adjusted under 35 U.S.C. 154(b) by 0 days.

(21) Appl. No.: 14/478,709

(22) Filed: Sep. 5, 2014

(65) Prior Publication Data
US 2015/0286066 A1    Oct. 8, 2015

Related U.S. Application Data

(60) Provisional application No. 61/995,210, filed on Apr. 7, 2014.

(51) Int. Cl.
*G02C 3/00*    (2006.01)

(52) U.S. Cl.
CPC ...................... *G02C 3/003* (2013.01)

(58) Field of Classification Search
CPC .................. G02C 3/003; G02C 5/16
USPC ............. 351/156, 157, 158; 2/452, 454, 426
See application file for complete search history.

(56) References Cited

U.S. PATENT DOCUMENTS

| 4,133,604 | A |   | 1/1979  | Fuller |
| 5,406,340 | A | * | 4/1995  | Hoff ............................. 351/156 |
| 6,449,777 | B1 |  | 9/2002  | Montague |
| 6,629,760 | B1 | * | 10/2003 | Razin ............................ 351/156 |
| 7,478,906 | B2 |  | 1/2009  | Fielding, Jr. |
| 8,523,350 | B2 |  | 9/2013  | Krisik et al. |
| 8,602,553 | B1 |  | 12/2013 | Valdez-Campbell |

OTHER PUBLICATIONS

Joe Light, "Fastech latches on to Velcro market," The Florida Times-Union, Mar. 12, 2007, printout from web page: http://jacksonville.com/tu-online/stories/031207/bus_8327006.shtml, 1 page.
Product description for DuraGrip brand Total Hook, printout from web page: http://hookandloop.com/products/specialty-hook-and-loop/2-duragrip-brand-total-hook-black, printout date: Aug. 28, 2014, initial posting date: unknown, 1 page.

* cited by examiner

*Primary Examiner* — Hung Dang
(74) *Attorney, Agent, or Firm* — Panitch Schwarze Belisario & Nadel LLP (57) ABSTRACT

A strap assembly includes a first elastic strap, a second elastic strap, a first piece of hook material and a second piece of hook material. The first elastic strap includes a first end and a second end, and a first side and a second side. The first elastic strap further includes a piece of loop material attached to the first side of the first end and another piece of loop material attached to the second side of the second end. The second elastic strap includes a first end and a second end, and a first side and a second side. The second elastic strap further includes a piece of loop material attached to the first side of the first end and a piece of hook material attached to the first side of the second end. The first piece of hook material and second piece of hook material preferably attach to opposite temporal regions of eyewear.

12 Claims, 8 Drawing Sheets

STRAP ASSEMBLY ADAPTED FOR USE TO SECURE EYEWEAR TO WEARER

CROSS-REFERENCE TO RELATED APPLICATIONS

This application claims priority to U.S. Provisional Patent Application No. 61/995,210 filed Apr. 7, 2014, which is incorporated herein by reference.

BACKGROUND OF THE INVENTION

The present invention relates generally to strap assemblies and, more specifically, a strap assembly adapted for use to secure eyewear to a wearer. Parents and caregivers of children or impaired adults (or generally any other wearer) are constantly burdened by dislodged eyewear. Dislodged eyewear can create many hazards, including the safety hazard of having a wearer whom cannot see or the financial hazard of damaging the eyewear.

One way of alleviating these burdens and hazards is to keep the eyewear retained on the wearer. Many wearers may accidentally or intentionally dislodge eyewear that is not secured in position. This dislodging can occur for various reasons, such as a wearer's daily activity, discomfort, impairment, or distaste for the eyewear.

Certain strap assemblies exist to retain eyewear securely on a wearer's head. Some of these strap assemblies are designed to hold the eyewear while the wearer is exercising or engaged in other physical activity during which the eyewear may slip and fall. Other strap assemblies are intended for use with swimming goggles (U.S. Pat. No. 7,478,906). Typically, these strap assemblies are designed for adjustability at the cost of being cumbersome and uncomfortable (U.S. Pat. Nos. 6,449,777; 8,602,553). One well known strap assembly loosely secures eyewear in position on a wearer, more specifically on the wearer's neck, but is typically used only by adults (U.S. Pat. Nos. 4,133,604; 8,523,350). Other strap assemblies use an adjustable bead in the back of the head, which requires the strap to be attached on both sides of the glasses and brought over the front of the face prior to adjusting. This design causes increased difficulty with attaching eyewear to a child and prevents the use of the strap while laying down or using a head rest. There is nothing currently available, for securing eyewear on a wearer with relative ease, in an manner adaptable to various eyewear, and in a sleek and stylish form.

Thus, it is one object of this invention to secure eyewear on a wearer and make it difficult for the wearer to remove the eyewear. Further, this invention aims to secure various shapes, sizes, and forms of eyewear through an adaptable assembly structure. Another object of this invention is to secure eyewear in a comfortable manner. One last object of this invention is to provide a stylish alternative to outdated retainer assemblies. Thus, the preferred embodiment is generally an assembly of straps and hook and loop materials for attaching to and holding in place eyewear.

These and other objects of the present invention will become more apparent upon a reading of the complete description thereof in combination with the following drawings.

BRIEF SUMMARY OF THE INVENTION

A strap assembly includes a first elastic strap, a second elastic strap, a first piece of hook material and a second piece of hook material. The first elastic strap includes a first end and a second end, and a first side and a second side. The first elastic strap further includes a piece of loop material attached to the first side of the first end and another piece of loop material attached to the second side of the second end. The second elastic strap includes a first end and a second end, and a first side and a second side. The second elastic strap further includes a piece of loop material attached to the first side of the first end and a piece of hook material attached to the first side of the second end. The first piece of hook material and second piece of hook material preferably attach to opposite temporal regions of eyewear, either on the inside or outside of the eyewear temporal regions.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 2A is a rear left perspective view of a step for attaching hook material to the eyewear;

FIG. 2D is a rear left perspective view of the first elastic strap and the second elastic strap mated to the eyewear;

DETAILED DESCRIPTION OF THE INVENTION

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the container assembly and related parts thereof. The terminology includes the above-listed words, derivatives thereof and words of similar import. The term "wearer" is used to describe a person wearing eyewear, but also includes, for the invention's purposes, any person utilizing the strap assembly for themselves or others.

Figure 1:
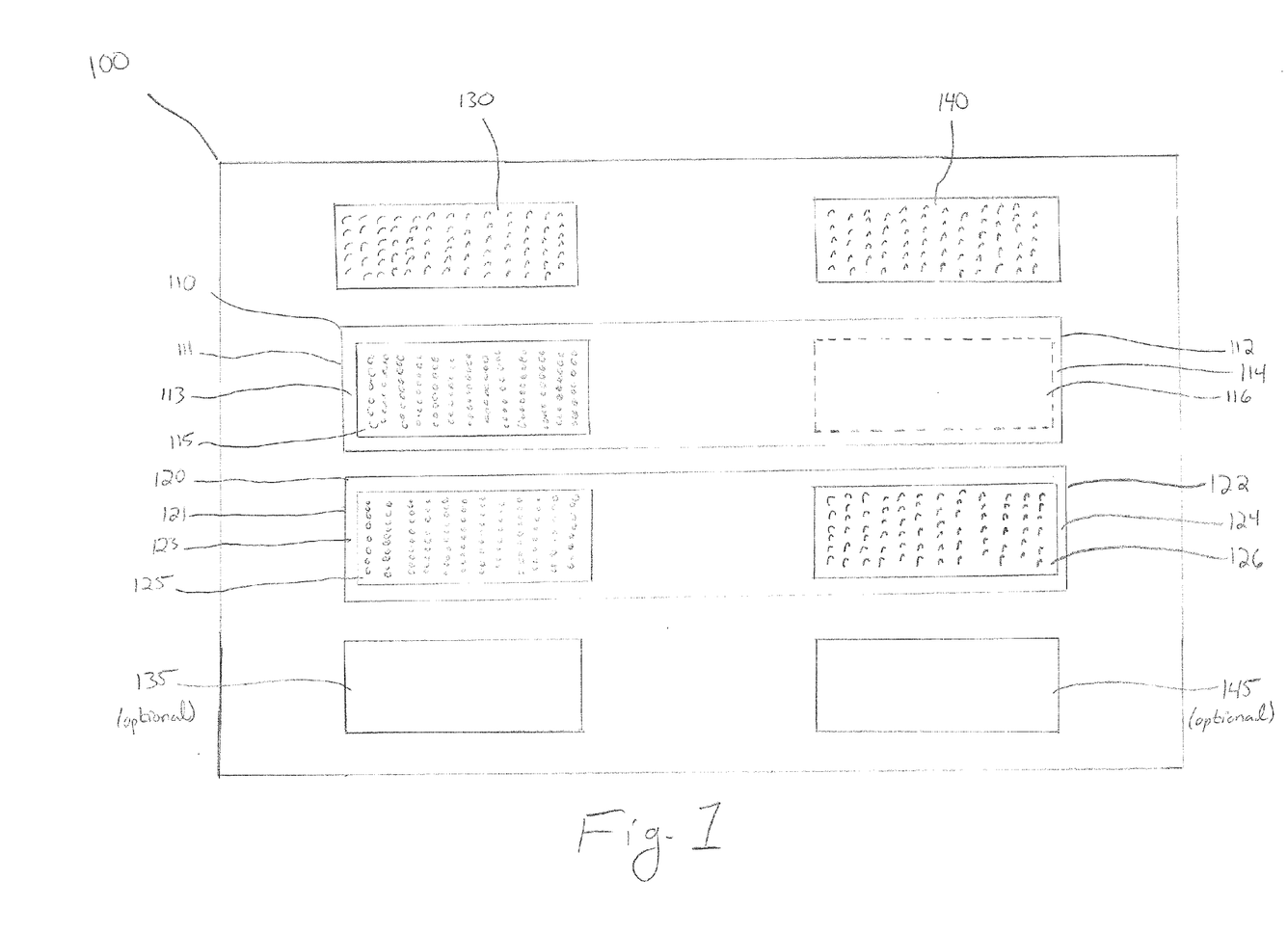
FIG. 1 is a top plan view of a kit for a strap assembly for use to secure eyewear to a wearer.
Figure 2B:
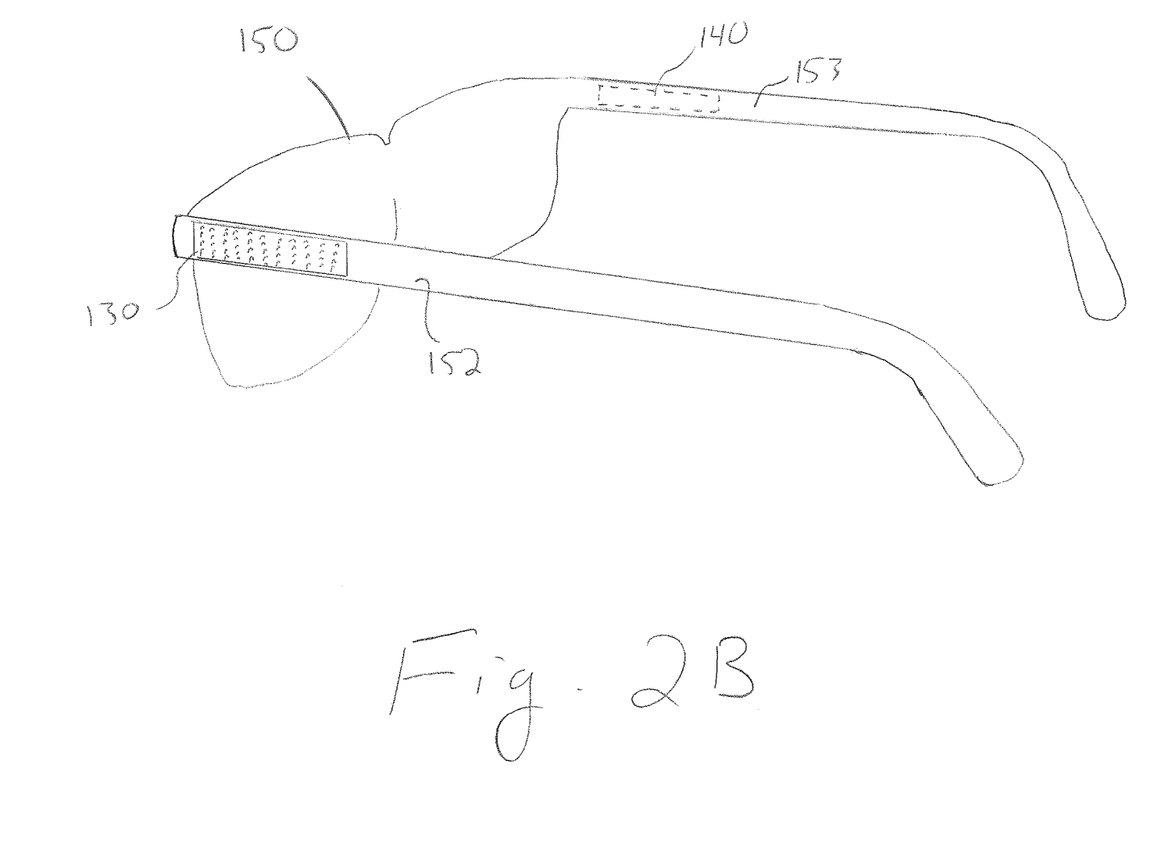
FIG. 2B is a rear left perspective view of hook material attached to the eyewear.
Figure 2C:
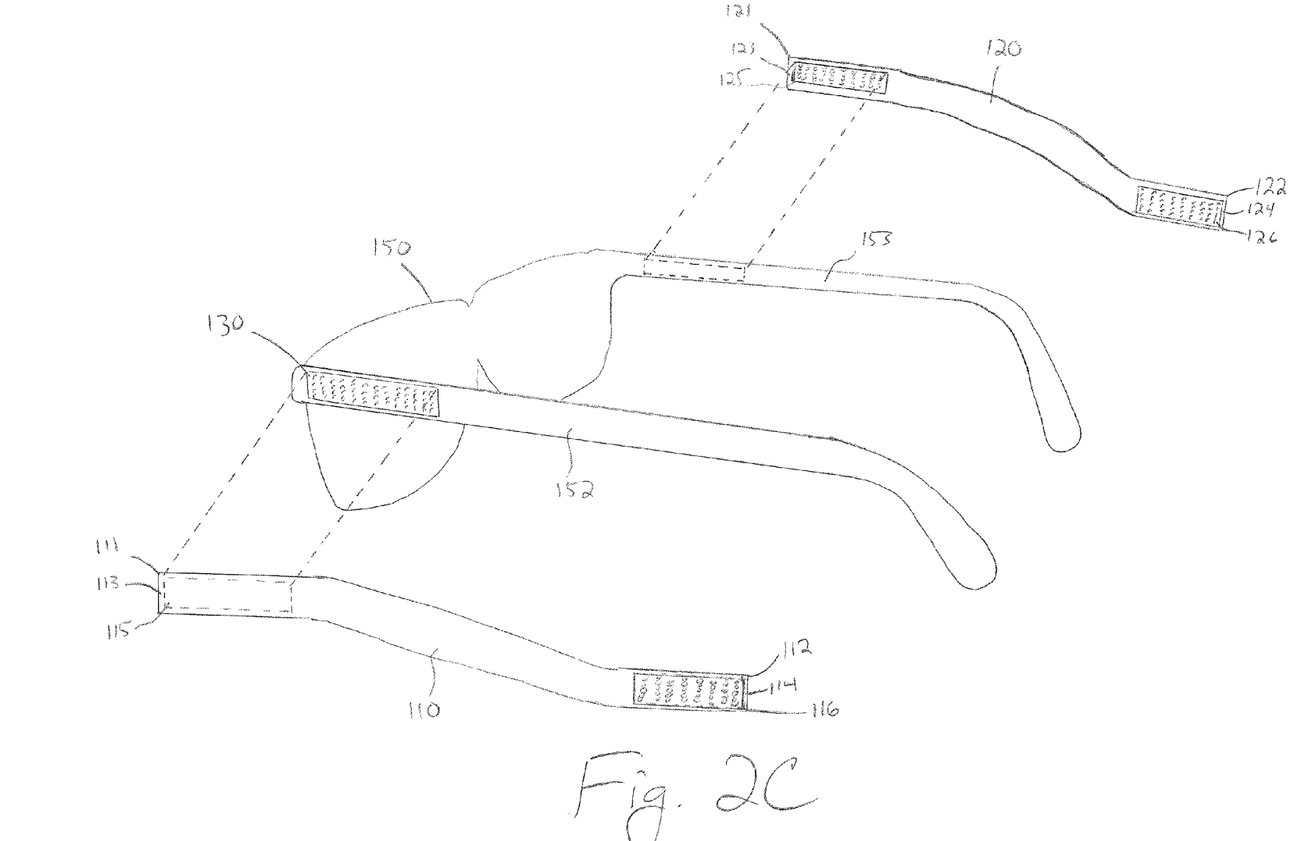
FIG. 2C is a rear left perspective view of a step for mating a first elastic strap and a second elastic strap to the eyewear.
Figure 2E:
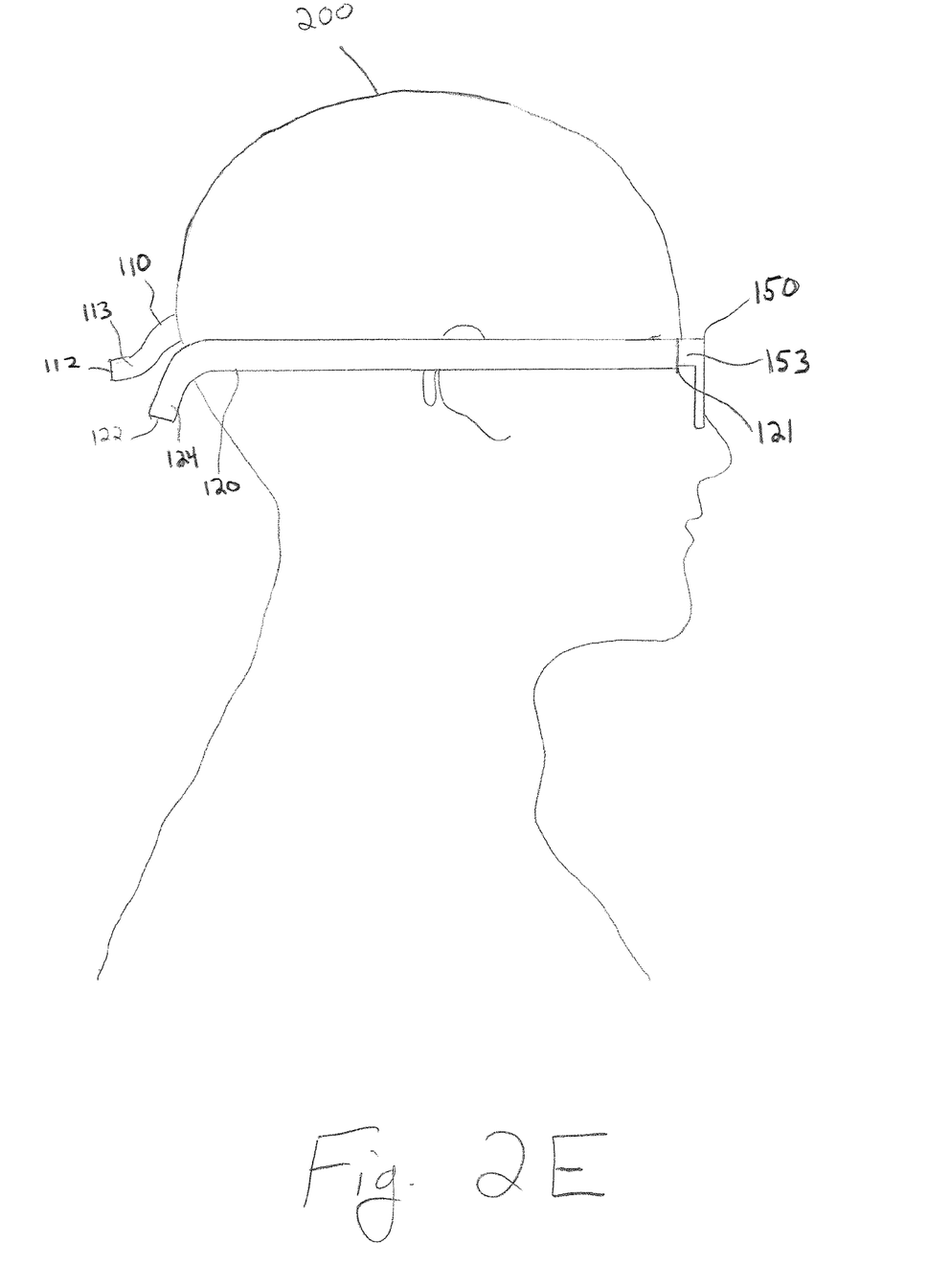
FIG. 2E is a right side view of the strap assembly and eyewear positioned on the wearer, wherein the first elastic strap and second elastic strap remain unmated.
Figure 2F:
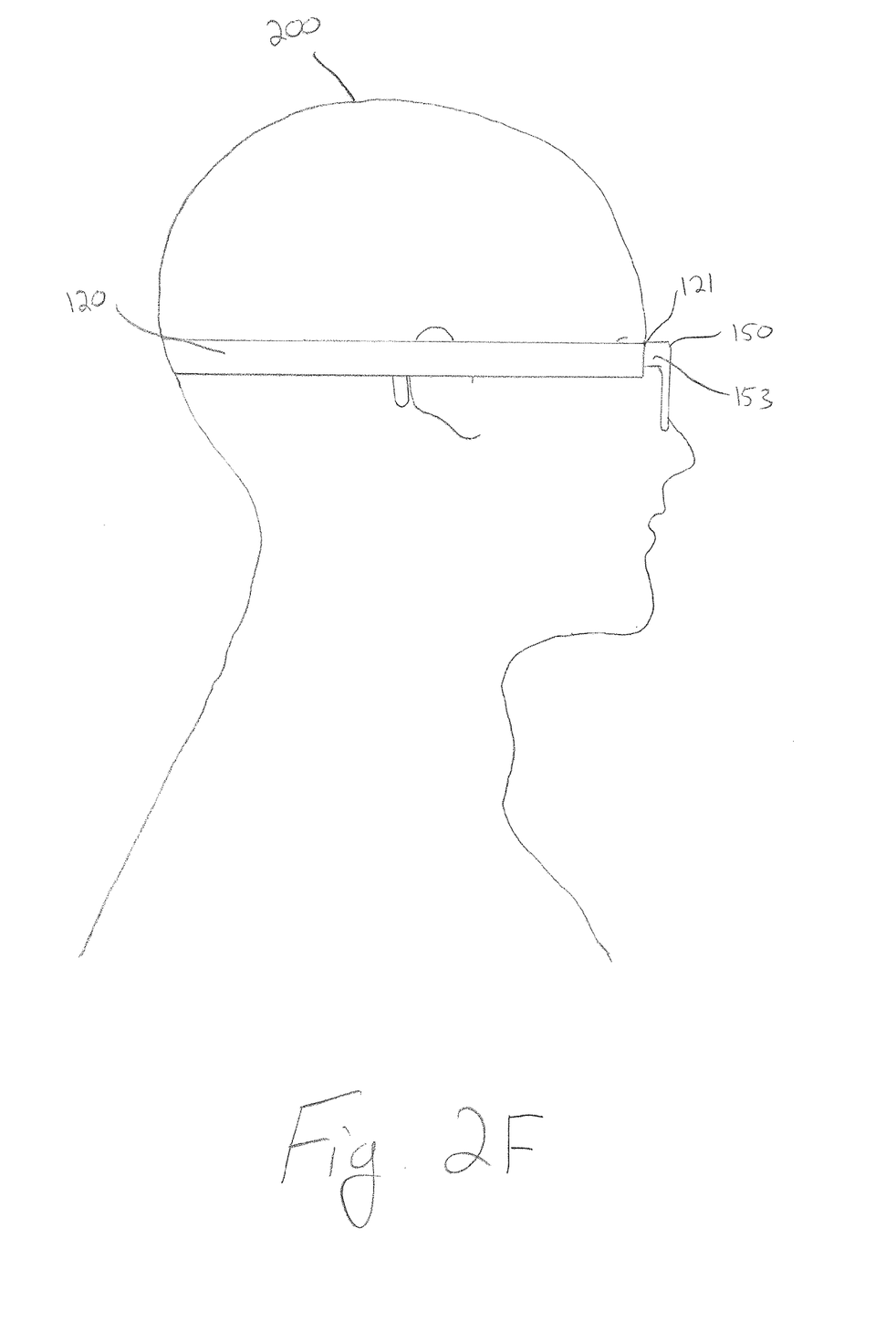
FIG. 2F is a right side view of the strap assembly and eyewear positioned on the wearer, wherein the first elastic strap and second elastic strap are mated.
Figure 2G:
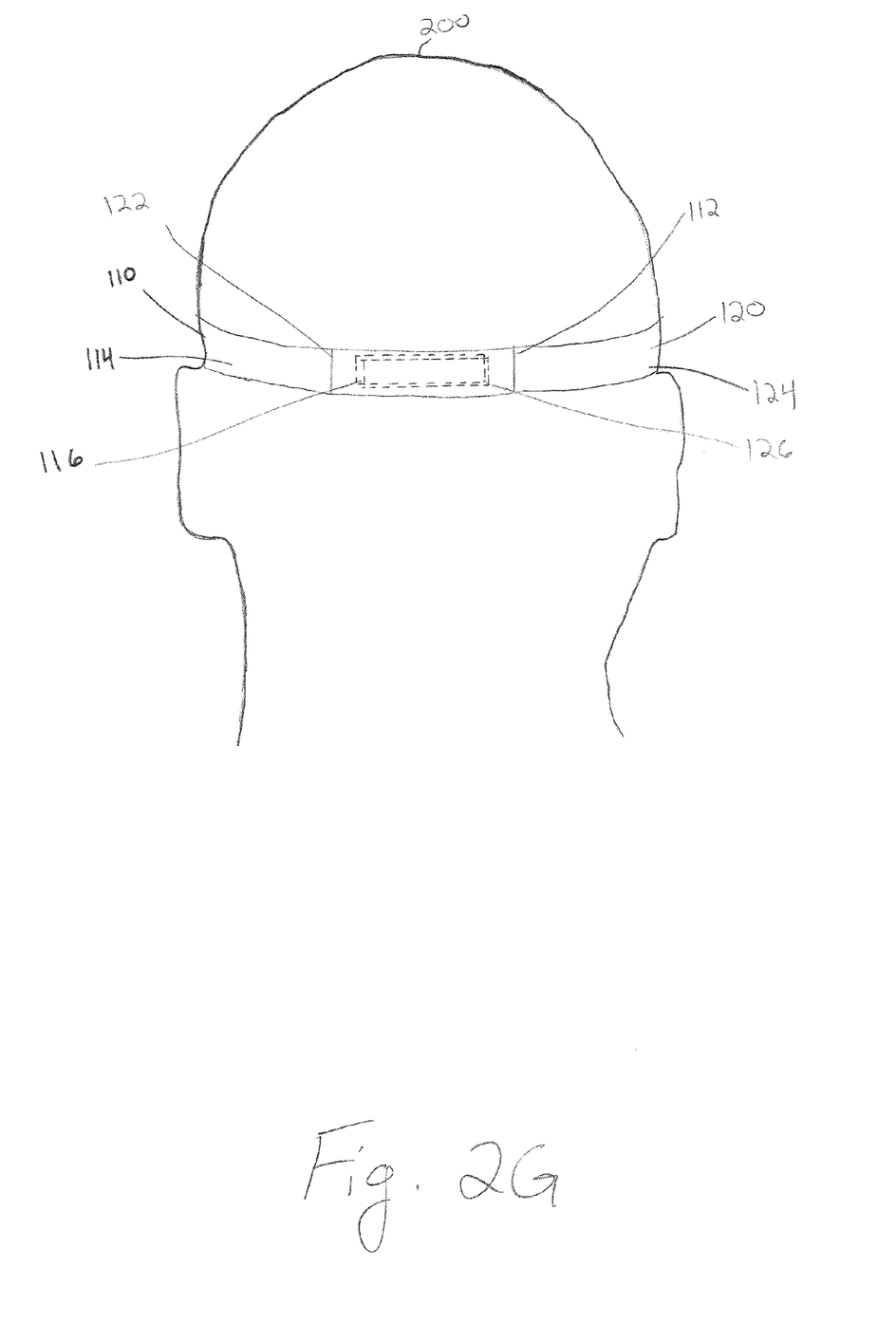
FIG. 2G is a rear plan view of the first elastic strap and second elastic strap after being mated.
Figure 3A:
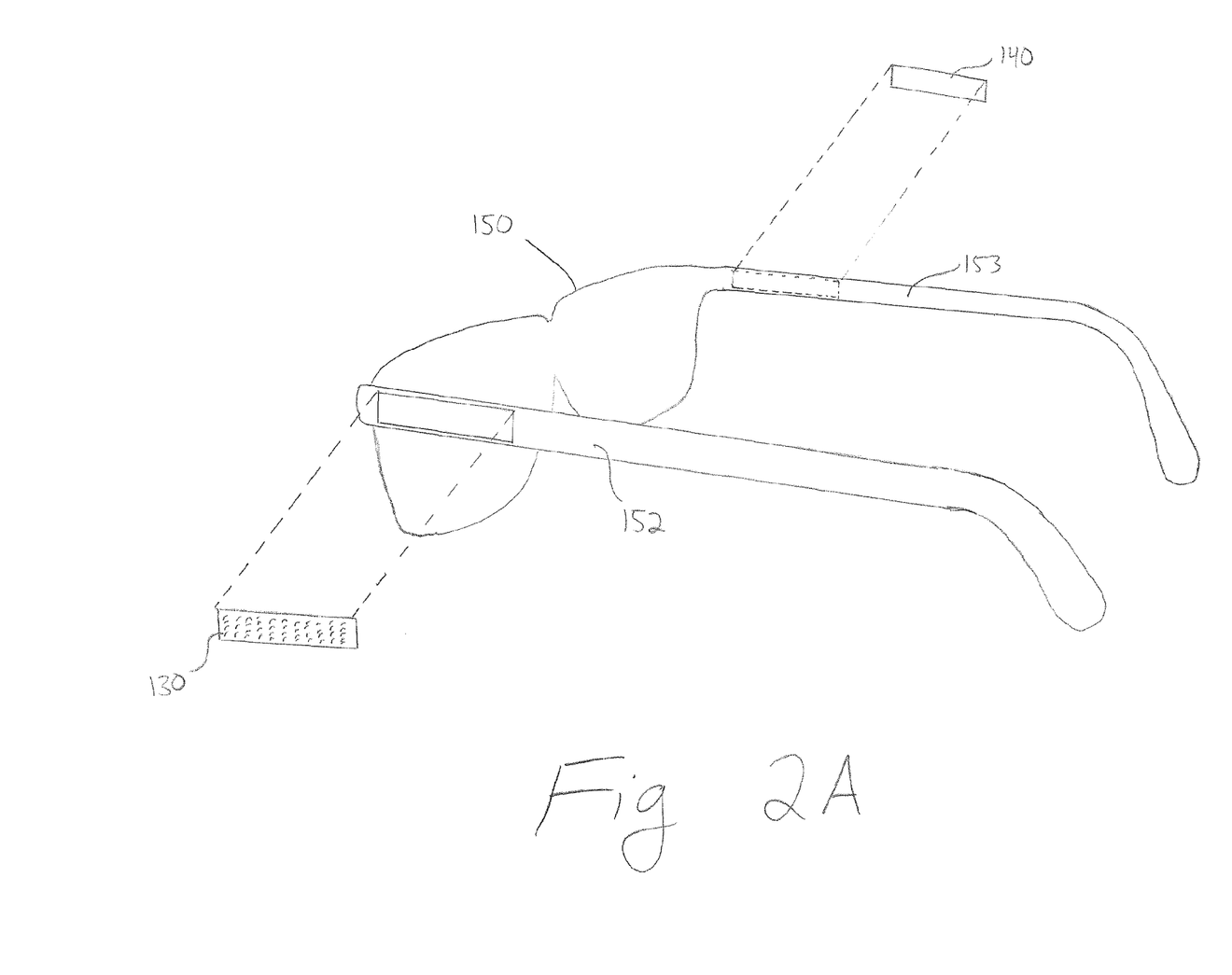
Figure 3D:
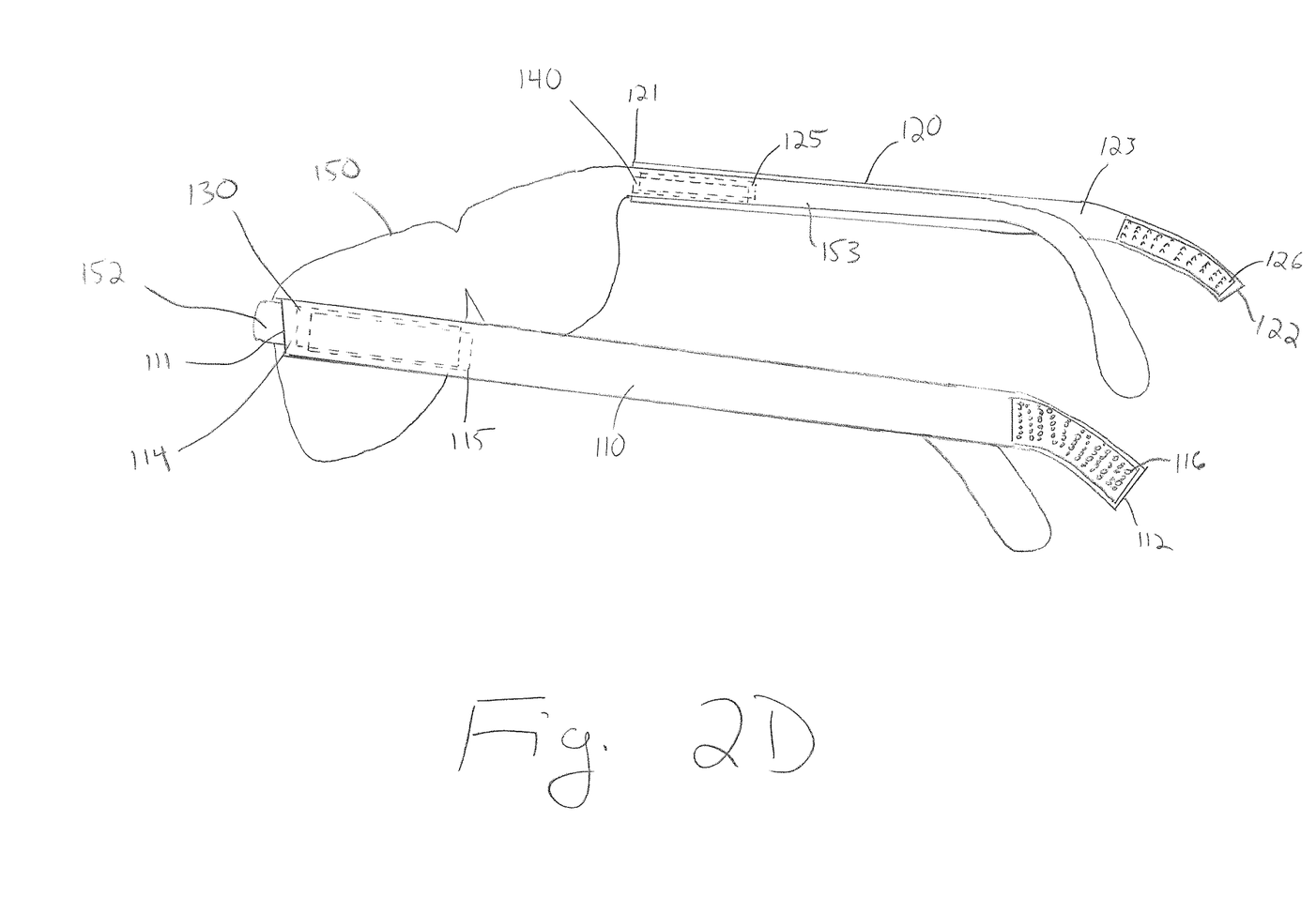

Referring to the drawings in detail, wherein like numerals indicate like elements throughout, and wherein dashed lines indicate an object hidden from view, FIGS. 1-2G show a strap assembly in accordance with a preferred embodiment of the present invention. The strap assembly can be primarily used to secure eyewear to a wearer such that the eyewear cannot be easily or accidentally dislodged. The strap assembly may also function as a decorative or stylish addition to eyewear.

Referring to FIGS. 1-2G, the strap assembly 100 includes a first elastic strap 110, a second elastic strap 120, a first piece of hook material 130 and a second piece of hook material 140. When configured, the strap assembly 100 secures eyewear 150 on a wearer 200.

The kit may optionally include two additional pieces of covering material 135 and 145 that are sized approximately the same, or slightly larger than the hook material 130 and 140 respectively. These additional pieces of covering material have loop material on one side (not shown since it is hidden from view in this front view). The purpose of these additional pieces of covering material 135 and 145 is described below.

Preferably, as shown in at least FIG. 1, the first elastic strap 110 includes a first end 111 and a second end 112, and a first side 113 and a second side 114. A piece of loop material 115 is preferably attached to the first side 113 of the first end 111 of the first elastic strap 110. A separate piece of loop material 116 is attached to the second side 114 of the second end 112 of the first elastic strap 110. The piece of loop material 116 attached to the second side 114 of the second end 112 of the first elastic strap 110 is not so limited, and may instead be attached to the first side 113 of the second end 112 of the first elastic strap 110. The pieces of loop material 115, 116 may be attached by various methods, including but not limited to sewing, gluing, heat activated welding, or any other similar method.

Again referring to FIG. 1, the preferred second elastic strap 120 includes a first end 121 and a second end 122, and a first side 123 and a second side 124. A piece of loop material 125 is preferably attached to the first side 123 of the first end 121 of the second elastic strap 120. A piece of hook material 126 is attached to the first side 123 of the second end 122 of the second elastic strap 120. The piece of hook material 126 attached to the first side 123 of the second end 122 of the second elastic strap 120 is not so limited, and may instead be attached to the second side 124 of the second end 122 of the second elastic strap 120. The piece of loop material 125 and piece of hook material 126 may be attached by various methods, including but not limited to sewing, gluing, heat activated welding, or any other similar method.

At least one purpose of the strap assembly 100 is to secure eyewear 150 to a wearer 200. One way this may be accomplished is by forming the first elastic strap 110 and second elastic strap 120 from stretchable or flexible materials. Preferably, the first elastic strap 110 and second elastic strap 120 are formed from fabrics, ribbons, or plastics. The first elastic strap 110 and second elastic strap 120 are not so limited and may be formed from, for example, any elastic material.

Another feature of the preferred first elastic strap 110 and second elastic strap 120 is that each may contain any decorative design (not shown) on the first sides 113, 123 or the second sides 114, 124. Such decorative designs may include movie characters, natural images, or any other appealing graphic.

Referring to FIGS. 1-2B, the preferred first elastic strap 110 and second elastic strap 120 may come in a kit, along with the first piece of hook material 130 and second piece of hook material 140. In at least one embodiment, the first piece of hook material 130 attaches to a left temporal region 152 of the eyewear 150. The first piece of hook material 130 mates with the piece of loop material 115 located on the first side 113 of the first end 111 of the first elastic strap 110. The first piece of hook material 130 is not so limited and may instead mate with the piece of loop material 125 located on the first side 123 of the first end 121 of the second elastic strap 120. Moreover, the first piece of hook material 130 may be attached to a right temporal region 153 of the eyewear 150.

The second piece of hook material 140 of the preferred embodiment, as shown in FIGS. 2A-2B, attaches to the right temporal region 153 of the eyewear 150. The second piece of hook material 140 mates with the piece of loop material 125 located on the first side 123 of the first end 121 of the second elastic strap 120. The second piece of hook material 140 is not so limited and may instead mate with the piece of loop material 115 located on the first side 113 of the first end 111 of the first elastic strap 110. Moreover, the second piece of hook material 140 may be attached to the left temporal region 152 of the eyewear 150.

Referring to FIGS. 2A-2B, the first piece of hook material 130 and second piece of hook material 140 are sized such that each may be fixably attached to either the left temporal region 152 or right temporal region 153 of the eyewear 150. In some embodiments, the first piece of hook material 130 and second piece of hook material 140 may be the same height as the left temporal region 152 and right temporal region 153 of the eyewear 150. In other embodiments, the first piece of hook material 130 and second piece of hook material 140 may be of a slightly lesser or greater height as the left temporal region 152 and right temporal region 153 of the eyewear 150 depending on the wearer's 200 desire. Even further, the first piece of hook material 130 and second piece of hook material 140 may be of a much greater size than any left temporal region 152 and right temporal region 153 of eyewear 150 to allow a wearer 200 to trim or cut the first piece of hook material 130 and second piece of hook material 140 as desired. The first piece of hook material 130 and second piece of hook material 140 may be attached to the eyewear 150 by various methods, including but not limited to gluing and heat activated welding, or any other similar method.

Referring to FIGS. 1-2D, the preferred strap assembly 100 comes in a kit and is installed by a wearer 200. Preferably, as shown in FIG. 2A-2B, a wearer 200 first attaches the first piece of hook material 130 to the left temporal region 152 of the eyewear 150. The wearer 200 subsequently attaches the second piece of hook material 140 to the right temporal region 153 of the eyewear 150. Although these steps are each crucial, the order is not so limited. For example, a wearer 200 may instead attach the second piece of hook material 140 to the right temporal region 153 of the eyewear 150 followed by attaching the first piece of hook material 130 to the left temporal region 152 of the eyewear 150. Conversely, as already set forth, the first piece of hook material 130 and second piece of hook material 140 may be reversed with one another. The first piece of hook material 130 may be attached to either the outside of the left temporal region 152 of the eyewear 150, as shown in FIGS. 1-2D, or on the inside of the left temporal region 152 of the eyewear 150 (not shown in the figures). The second piece of hook material 140 may likewise be attached to either the outside or the inside of the right temporal region 153 of the eyewear 150.

Referring to FIG. 2C-2E, the preferred method of attaching the first elastic strap 110 and second elastic strap 120 requires a wearer 200 to first mate the piece of loop material 115 of the first side 113 of the first end 111 of the first elastic strap 110 to the first piece of hook material 130. Next, a wearer 200 mates the piece of loop material 125 of the first side 123 of the first end 121 of the second elastic strap 120 to the second piece of hook material 140. Although these steps are each necessary, the order is not so limited. For example, a wearer 200 may instead first mate the piece of loop material 125 of the first side 123 of the first end 121 of the second elastic strap 120 to the second piece of hook material 140. A wearer 200 may also alter the orientation of either the first elastic strap 110 or second elastic strap 120, such as, for example, by mating the piece of loop material 116 of the second side 114 of the second end 112 of the first elastic strap 110 to the first piece of hook material 130.

Referring to FIG. 2F, once the first elastic strap 110 and second elastic strap 120 are mated to the eyewear 150, a wearer 200 mates the piece of hook material 126 of the first side 123 of the second end 122 of the second elastic strap 120 to the piece of loop material 116 of the second side 114 of the second end 112 of the first elastic strap 110 to secure the eyewear 150 on the wearer 200. In the preferred embodiment, this mating step is performed while the eyewear 150 is positioned on the wearer 200. This step, however, is not limited to being performed while the eyewear 150 is positioned on the wearer 200 and may, for example, be performed while the wearer 200, or any other person, holds the eyewear 150 and thereafter positions the eyewear 150 and strap assembly 100.

FIG. 2A shows the process of attaching the first piece of hook material 130 and second piece of hook material 140 to the eyewear 150. These attachment steps may only need to be performed once; and thereafter, the only remaining steps for the wearer 200 include mating the piece of loop material 115 of the first side 113 of the first end 111 of the first elastic strap 110 to the first piece of hook material 130; mating the piece of loop material 125 of the first side 123 of the first end 121 of the second elastic strap 120 to the second piece of hook material 140; and mating the piece of hook material 126 of the first side 123 of the second end 122 of the second elastic strap 120 to the piece of loop material 116 of the second side 114 of the second end 112 of the first elastic strap 110 to secure the eyewear 150 on the wearer 200.

In one preferred embodiment, the eyewear 150 is placed on the wearer's 200 head before the first and second elastic straps 110, 120 are attached. In an alternate embodiment, the eyewear 150 may be placed on the wearer's 200 head after the first and second elastic straps 110, 120 are attached.

It will be understood by those skilled in the art that any piece of hook material and loop material may be interchanged, so long as there is an opposing piece of hook material or loop material for mating. For example, and in no way limiting, the piece of loop material 116 may be replaced by a piece of hook material (not shown) if the counterpart piece of hook material 126 were also replaced by a piece of loop material (not shown). Furthermore, for example, the first piece of hook material 130 and second piece of hook material 140 may both be replaced by separate pieces of loop material (not shown) if the counterpart pieces of loop material 115, 125 were also replaced by separate pieces of hook material (not shown). In other embodiments, pieces of hook and loop materials may be interchanged and reversed to improve wearer comfort, reduce production costs, or embrace certain styles.

The preferred embodiment shows one of many possible orientations. The first elastic strap 110 and second elastic strap 120 may be interchanged or have the physical orientations reversed to create a different visual effect, so long as the pieces of hook and loop material may still mate to secure eyewear to the wearer.

The additional pieces of covering material 135 and 145 may be attached to the first piece of hook material 130 and the second piece of hook material 140, respectively, of the eyewear 150 when the wearer 200 is not using the first and second elastic straps 110, 120. In this manner, the additional pieces of covering material 135 and 145 cover and overlap the first piece of hook material 130 and the second piece of hook material 140, respectively, thereby improving the aesthetic appearance of the eyewear 150. If the first and second elastic straps 110, 120 have a decorative design, then the additional pieces of covering material 135 and 145 may include a similar decorative design. When it is desired to use the first and second elastic straps 110, 120, the additional pieces of covering material 135 and 145 are removed and replaced by the first and second elastic straps 110, 120 in the manner described above. The covering material 135 and 145 may be constructed of the same or different material as the first and second elastic straps 110, 120. It is not necessary that the covering material 135 and 145 have any elasticity.

The various hook material and loop material described above may also be substituted by a single material that combines the hook and loop on one side, such as in alternating rows. The back side of this material may be similar to the back side of the various hook material and loop material described above. In this manner, the hook material and the loop material are identical in structure. One product that is suitable for use as a single hook and loop material is DuraGrip® brand Total Hook, commercially available from Fastech of Jacksonville Inc. The back side of this product is a flat nylon surface.

In one embodiment, the elastic straps 110, 120 may formed of neoprene.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A kit for a strap assembly adapted for use to secure eyewear in position on a wearer, the kit comprising:
    a) a first elastic strap, the first elastic strap comprising a first free end and a second free end, and a first side and a second side, only the first side of the first free end of the first elastic strap and the second side of the second free end of the first elastic strap including a respective piece of loop material;
    b) a second elastic strap, the second elastic strap comprising a first free end and a second free end, and a first side and a second side, only the first side of the first free end of the second elastic strap including a piece of loop material, only the first side of the second free end of the second elastic strap including a piece of hook material;
    c) a first piece of hook material for attachment to a left temporal region of the eyewear; and
    d) a second piece of hook material for attachment to a right temporal region of the eyewear,
    wherein in an assembled configuration, the piece of loop material of the first free end of the first elastic strap is attached to the first piece of hook material, the piece of loop material of the first free end of the second elastic strap is attached to the second piece of hook material, and the piece of loop material of the second free end of the first elastic strap is attached to the piece of hook material of the second free end of the second elastic strap.

2. The kit of claim 1, wherein the first elastic strap and second elastic strap are formed of materials selected from the group consisting of fabrics, ribbons, and plastics.

3. The kit of claim 1, wherein the first piece of hook material and second piece of hook material are sized to be fixably attached to the left and right temporal regions of eyewear, respectively.

4. The kit of claim 1, further comprising:
    e) a first piece of covering material, the first piece of covering material including a first side and a second side, wherein one side includes a piece of loop material, the first piece of covering material having a size which is about the same size as the first piece of hook material so as to substantially overlap and cover the first piece of hook material; and f) a second piece of covering material, the second piece of covering material including a first side and a second side, wherein one side includes a piece of loop material, the second piece of covering material having a size which is about the same size as the second piece of hook material so as to substantially overlap and cover the second piece of hook material.

5. A method of attaching a strap assembly for use to secure eyewear in position on a wearer, the strap assembly comprising a first elastic strap, the first elastic strap comprising a first free end and a second free end, and a first side and a second side, and the first side of the first free end of the first elastic strap including a piece of loop material, the second side of the second free end of the first elastic strap including a piece of loop material; a second elastic strap comprising a first free end and a second free end, and a first side and a second side; the first side of the first free end of the second elastic strap including a piece of loop material, the first side of the second free end of the second elastic strap including a piece of hook material; a first piece of hook material for attachment to a left temporal region of the eyewear; and a second piece of hook material for attachment to a right temporal region of the eyewear, the method comprising the steps of:
 a) attaching the first piece of hook material to the left temporal region of the eyewear;
 b) attaching the second piece of hook material to the right temporal region of the eyewear;
 c) mating the loop material of the first free end of the first elastic strap to the first piece of hook material;
 d) mating the loop material of the first free end of the second elastic strap to the second piece of hook material;
 e) mating the loop material of the second free end of the first elastic strap to the hook material of the second free end of the second elastic strap while the eyewear is positioned on the wearer.

6. The method of claim 5, wherein the first elastic strap and second elastic strap are formed of materials selected from the group consisting of elastic materials, fabrics, ribbons, and plastics.

7. The method of claim 5 wherein the first piece of hook material is attached to the outside of the left temporal region of the eyewear and the second piece of hook material is attached to the outside of the right temporal region of the eyewear.

8. The method of claim 5 wherein the first piece of hook material is attached to the inside of the left temporal region of the eyewear and the second piece of hook material is attached to the inside of the right temporal region of the eyewear.

9. A method of attaching a strap assembly for use to secure eyewear in position on a wearer, the strap assembly comprising a first elastic strap, the first elastic strap comprising a first free end and a second free end, and a first side and a second side, and the first side of the first free end of the first elastic strap including a piece of loop material, the second side of the second free end of the first elastic strap including a piece of loop material; a second elastic strap comprising a first free end and a second free end, and a first side and a second side, the first side of the first free end of the second elastic strap including a piece of loop material, the first side of the second free end of the second elastic strap including a piece of hook material; a first piece of hook material being preattached to a left temporal region of the eyewear; and a second piece of hook material being preattached to a right temporal region of the eyewear, the method comprising the steps of:
 a) mating the loop material of the first free end of the first elastic strap to the first piece of hook material;
 b) mating the loop material of the first free end of the second elastic strap to the second piece of hook material;
 c) placing the eyewear on a wearer; and
 d) mating the loop material of the second free end of the first elastic strap to the hook material of the second free end of the second elastic strap.

10. The method of claim 9, wherein the first elastic strap and second elastic strap are formed of materials selected from the group consisting of elastic materials, fabrics, ribbons, and plastics.

11. The method of claim 9 wherein the first piece of hook material is preattached to the outside of the left temporal region of the eyewear and the second piece of hook material is preattached to the outside of the right temporal region of the eyewear.

12. The method of claim 9 wherein the first piece of hook material is preattached to the inside of the left temporal region of the eyewear and the second piece of hook material is preattached to the inside of the right temporal region of the eyewear.

* * * * *